United States Patent
Markowitz

(10) Patent No.: US 8,766,972 B2
(45) Date of Patent: Jul. 1, 2014

(54) METHOD AND SYSTEM FOR EFFICIENT TRANSMISSION OF RICH THREE-DIMENSIONAL GEOMETRY AND ANIMATION CONTENT OVER NARROW BAND COMMUNICATION NETWORKS

(76) Inventor: Moshe Itzhak Markowitz, Kochav Yair (IL)

( * ) Notice: Subject to any disclaimer, the term of this patent is extended or adjusted under 35 U.S.C. 154(b) by 1133 days.

(21) Appl. No.: 12/260,199

(22) Filed: Oct. 29, 2008

(65) Prior Publication Data

US 2009/0110307 A1   Apr. 30, 2009

Related U.S. Application Data

(60) Provisional application No. 61/000,657, filed on Oct. 29, 2007.

(51) Int. Cl.
| | |
|---|---|
| G06T 15/00 | (2011.01) |
| G06T 17/00 | (2006.01) |
| G06T 9/00 | (2006.01) |
| G06T 19/20 | (2011.01) |
| G06T 15/10 | (2011.01) |

(52) U.S. Cl.
CPC .............. G06T 19/20 (2013.01); G06T 15/10 (2013.01)
USPC ........................... 345/419; 345/420; 345/555

(58) Field of Classification Search
CPC ................................ G06T 19/20; G06T 15/10
USPC .......................................... 345/419, 420, 555
See application file for complete search history.

(56) References Cited

U.S. PATENT DOCUMENTS

| | | | | |
|---|---|---|---|---|
| 4,821,214 A | * | 4/1989 | Sederberg | 345/420 |
| 4,888,583 A | * | 12/1989 | Ligocki et al. | 345/420 |
| 5,883,631 A | * | 3/1999 | Konno et al. | 345/423 |
| 5,903,272 A | * | 5/1999 | Otto | 345/421 |
| 6,426,748 B1 | | 7/2002 | Megahed | |
| 6,714,200 B1 | | 3/2004 | Talnykin et al. | |
| 6,795,069 B2 | * | 9/2004 | Raskar et al. | 345/419 |
| 7,248,257 B2 | | 7/2007 | Elber | |
| 2002/0145607 A1 | * | 10/2002 | Dimsdale | 345/423 |
| 2002/0154126 A1 | * | 10/2002 | Vienneau et al. | 345/473 |
| 2002/0154127 A1 | * | 10/2002 | Vienneau et al. | 345/473 |
| 2002/0157105 A1 | * | 10/2002 | Vienneau et al. | 725/105 |
| 2003/0052875 A1 | * | 3/2003 | Salomie | 345/419 |
| 2004/0239679 A1 | * | 12/2004 | Ito et al. | 345/555 |
| 2006/0284867 A1 | * | 12/2006 | Ishikawa et al. | 345/419 |

OTHER PUBLICATIONS

Igarashi et al.; Teddy: A Sketching Interface for 3D Freeform Design; 1999; ACM SIGGRAPH 1999; pp. 409-416.*

* cited by examiner

*Primary Examiner* — David T Welch
(74) *Attorney, Agent, or Firm* — Browdy and Neimark, PLLC

(57) ABSTRACT

A method and system for compacting and distributing graphic data by representing three-dimensional models by primitive objects that are predefined in the system and instructions, which may include solid modeling operations for constructing at least one model from the identified primitive objects. The method and system enable creating compacted representation files that can be distributed via one or more communication network, where a client application enables reconstruction of the models represented by the data in the representation files by combining the primitive objects constructing the model according to the set of instructions that enable the actual construction.

12 Claims, 8 Drawing Sheets

METHOD AND SYSTEM FOR EFFICIENT TRANSMISSION OF RICH THREE-DIMENSIONAL GEOMETRY AND ANIMATION CONTENT OVER NARROW BAND COMMUNICATION NETWORKS

CROSS REFERENCE TO RELATED APPLICATION

This application claims the benefit of U.S. Provisional Patent Application 61/000,657, filed Oct. 29, 2007, which is incorporated herein by reference in its entirety.

FIELD OF THE INVENTION

The present invention relates generally to the field of three-dimensional computer graphics and animation and more particularly to compacting of three-dimensional graphics and animation graphic-files for transmitting of compacted graphic files through communication networks.

BACKGROUND

The progress of the semiconductor industry in recent years has brought a high computing power to end users using various types of end terminals such as Personal Computes (PCs). PCs today are equipped with powerful three-dimensional (3D) graphic accelerators capable of rendering hundreds of thousand polygons in a fraction of a second, enabling real time 3D animation of complex scenes.

Despite clear advantages provided by current 3D graphics and animation software and hardware tools, such as high resolution power and a profound user experience when creating graphics and animation files, the graphic content, as currently presented in Internet browsers, is almost exclusively based on two-dimensional types of media (text, graphic-files, movies, Flash animation, etc).

The existing 3D authoring graphics tools create very rich and complex animation content and even present it on their own graphic window, in a real-time frame rate. However, transferring this content, through the Internet or any other communication network, is highly limited by the current available technology.

The available 3D internet formats (such as VRML and its successor X3D), based on current technology, are based on polygonal representation, characterized by large volume even for relatively simple geometric objects. The animation supported by these formats is limited to rigid body animation and cannot cope with today's rich animation standards, which present soft, amorphous and dynamically changing geometrical objects.

Current 3D web visualization plug-ins are based on polygonal formats. That is, besides a limited set of primitive objects such as Box, Cylinder, Sphere and Cone, most object geometries are approximated by meshes of polygons. The advantage of this format is that it is most suitable for display on graphical hardware and hence the required computation is minimal and the implementation is usually straightforward. There are, however, a few disadvantages associated with polygonal formats:

A first disadvantage is that typically, the communication network's bandwidth requirements are high, even for simple graphic models. Therefore, the transmission time to the client is high.

Various compression and streaming technologies provide only a partial solution such as the polygonal formats, which are limited to animation of fixed geometries, and do not allow animation of geometries that change with time, such as animated characters, faces, and soft deformable objects.

SUMMARY

The present invention, in some embodiments thereof, provides a system and a method for compacting at least one three-dimensional graphic file comprising at least one three-dimensional model. The system may further facilitate efficient distribution of the compacted representation files via at least one data communication network.

According to some embodiments of the invention, the system may comprise: at least one author application enabling compacting each three-dimensional graphic model in the graphic file into at least one compacted representation file; at least one client application enabling displaying compacted representation files; and at least one primitive objects' database comprising predefined three-dimensional primitive objects, wherein the at least one database is operatively associated with the at least one client and the at least one author application.

The author application may enable compacting each graphic model by representing each of its graphic models as a set of primitive objects and a set of instructions and other additional model's properties enabling to combine at least two primitive objects to construct the graphical model, where the primitive objects may be indicated by indicators in the representation file.

The at least one client application may enable retrieving the indicators enabling to identify the primitive objects, the instructions and the properties of each model, and constructing each model represented by the representation file by combining the retrieved primitive objects according to the instructions and properties in the representation file.

The system may further comprise at least one server operatively associated with the at least one author application, enabling to communicate with the at least one client application to allow distributing of compacted representation files to a multiplicity of users.

The author application may also enable compacting and streaming frames of an animation movie, where each frame comprises at least one model, which is transmitted through predefined time intervals to a viewer. The compacting may allow optimizing the data losses and time saving in an online streaming of the animation movie data by transmitting the compacted representation files of the animation movie via the at least one data communication network.

The at least one primitives' database may be at least one of: at least one remote primitives' database or at least one local primitives' database.

The author application may comprise: an editor application, enabling carrying out the compacting of graphic-files into compacted representation files and transmission of the compacted representation files through at least one communication network; a graphic application enabling reading of three-dimensional graphic-files as well as enabling the user to create and modify three-dimensional models of graphic-files to create the representation files associated with the models of the graphic-file; and at least one display unit enabling the user to view three-dimensional models and other features of the graphic-file.

The graphic application may enable reading and creating frames of an animation movie wherein each graphic-file is at least one frame of the animation movie, wherein the editor application enables compacting the graphic-files of each frame of the movie into compacted representation files as well as online continuous transmission of the compacted representation files of the frames, to optimize time saving in streaming of the animated movie frames through the at least one data communication network.

The client application may comprise: a viewer application, enabling identifying models, primitive objects, Instructions for combining the primitive objects and other model properties; a geometric modeler enabling to operate the instruction of the representation file upon the objects indicated in the representation file to construct the model compacted thereby; and at least one display unit enabling the user to view three-dimensional models.

The viewer, geometric modeler and display unit may be operatively associated enabling receiving of compacted representation files and displaying models by displaying identified primitive objects of each model of each compacted representation file according to the instructions for combining the objects and other model properties. The instructions may be translated by the viewer application into a set of computer readable instructions according to which the models may be combined and displayed.

The geometric modeler may enable processing graphic data and the interface may enable the user to create graphic-files, and define models and models' properties using graphic tools of the graphic application such as, for instance, CAD (Computer-Aided Design) tools and technology.

The server may be a web server enabling online storing and transmitting of compacted representation files, where the client application may run in the server allowing a multiplicity of user to share graphic-files and models.

At least some of the predefined primitive objects that are identified by the system may be non-uniform rational B-splines (NURBS) surfaces, where each NURBS surfaced object may be defined by control points and by at least one cross section object.

The system may further enable storing models as primitive objects in the at least one primitives database.

The client application may identify the primitive objects of each model by searching the objects through the at least one primitives databases, according to the indicators of the primitive objects and by retrieving the primitive objects associated with the indicators from the at least one primitives' database.

BRIEF DESCRIPTIONS OF THE DRAWINGS

The subject matter regarded as the invention will become more clearly understood in light of the ensuing description of embodiments herein, given by way of example and for purposes of illustrative discussion of the present invention only, with reference to the accompanying drawings, wherein FIG. 1 is a schematic illustration of a three-dimensional model, according to some embodiments of the invention;

Figure 6:
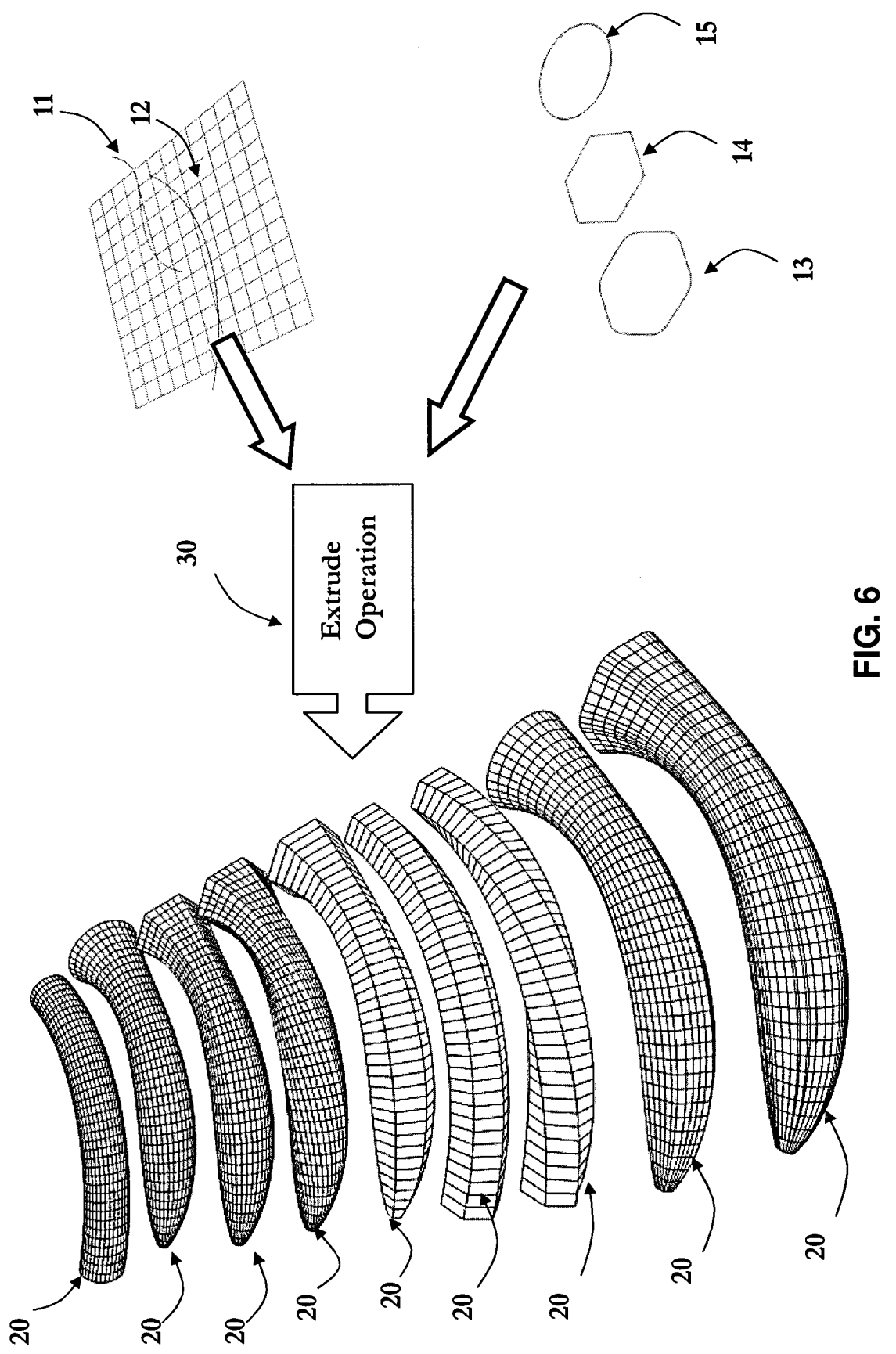
Figure 7:
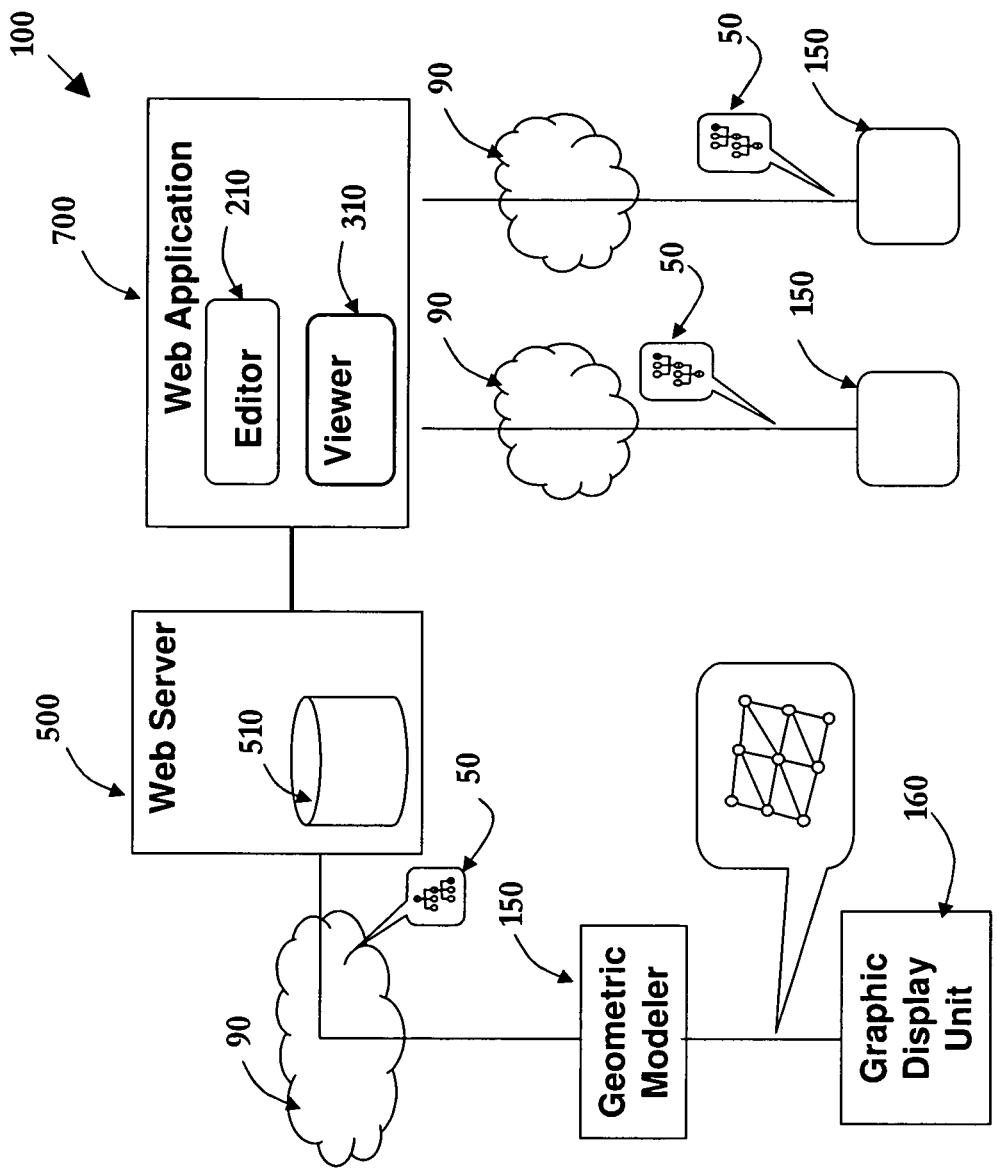
Figure 8:
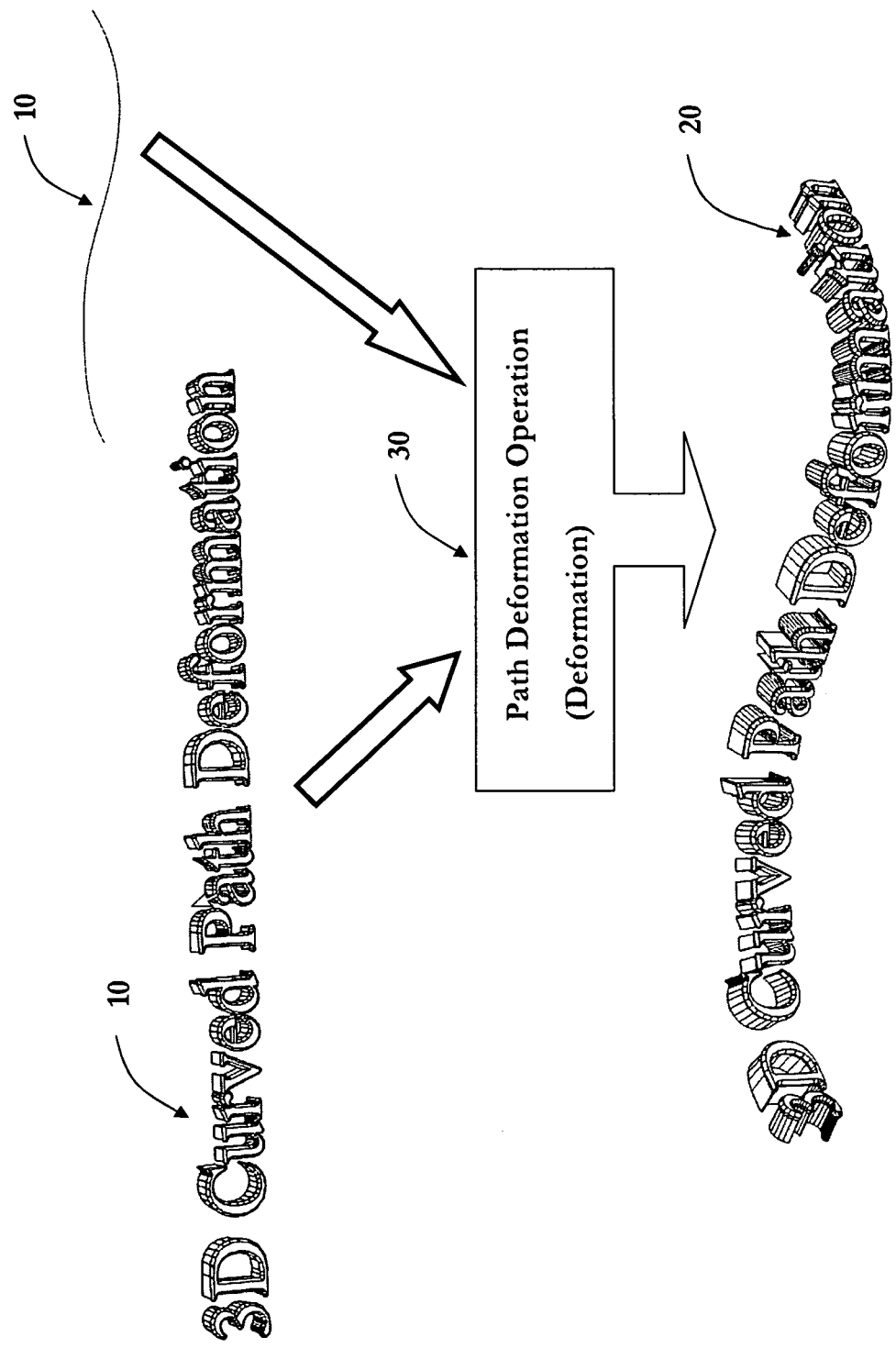

FIG. 6 schematically illustrates extruded profiles along curved path construction, according to some embodiments of the invention;

FIG. 7 is a schematic illustration of web application for compacting and rendering of 3D animation files, according to some embodiments of the invention; and FIG. 8 schematically illustrates deformation of a given geometry along a given path and its compact representation, according to some embodiments of the invention.

The drawings together with the description make apparent to those skilled in the art how the invention may be embodied in practice.

DETAILED DESCRIPTIONS

While the description below contains many specifications, these should not be construed as limitations on the scope of the invention, but rather as exemplifications of the preferred embodiments. Those skilled in the art will envision other possible variations that are within its scope. Accordingly, the scope of the invention should be determined not by the embodiment illustrated, but by the appended claims and their legal equivalents.

An embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiments, but not necessarily all embodiments, of the inventions. It is understood that the phraseology and terminology employed herein is not to be construed as limiting and are for descriptive purpose only.

The principles and uses of the teachings of the present invention may be better understood with reference to the accompanying description, figures and examples. It is to be understood that the details set forth herein do not construe a limitation to an application of the invention. Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, or integers or groups thereof and that the terms are to be construed as specifying components, features, steps or integers. The phrase "consisting essentially of", and grammatical variants thereof, when used herein is not to be construed as excluding additional components, steps, features, integers or groups thereof but rather that the additional features, integers, steps, components or groups thereof do not materially alter the basic and novel characteristics of the claimed composition, device or method.

If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks. The term "method" refers to manners, means, techniques and procedures for accomplishing a given task including, but not limited to, those manners, means, techniques and procedures either known to, or readily developed from known manners, means, techniques and procedures by practitioners of the art to which the invention belongs. The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention can be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

The present invention, in some embodiments thereof, provides a computerized system and method for compacting, rendering and distributing data of two-dimensional (2D) and/or three-dimensional (3D) graphic-files comprising graphical content such as one ore more 3D models, where the compacting is efficient and minimizes the data losses in compacting.

A model 20 may be a geometrical and/or graphical shape, which may also have predefined features such as positioning in space (coordinates), color, texture, size and the like, as known in the art. The graphic-file may be an animation file or a file comprising one or more frames of an animation movie. The model 20 may be created in any software tools and methods known in the art such as CAD and 3D modeling, using any methods and technologies such as Solid-modeling and computer-graphics and the like.

The invention, according to embodiments thereof, may allow online streaming of graphic-files that create animation content such as animation scenes and frames constructing an animation movie, where the compacting may allow a faster and a more efficient way in transmitting 3D content from one user terminal to another.

To view received compacted files, also referred to in this document as "representation files" and/or "compacted representation files", a viewer may need software tools enabling to receive and decode the compacted data and display the models 20 of the original non-compacted graphic-file by following instructions encrypted in the compacted representation file.

Figure 1:
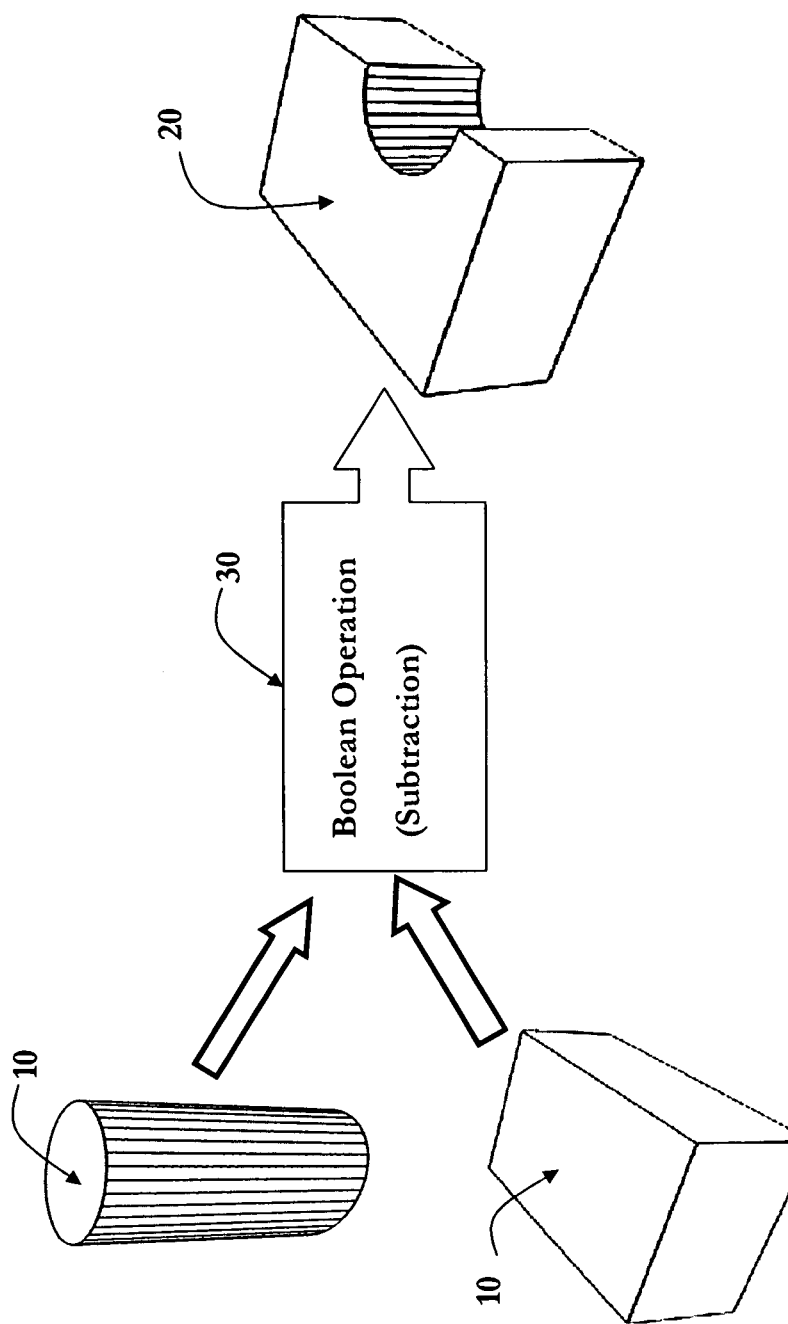

FIG. 1 is a schematic illustration of a model 20 construction, according to some embodiments of the invention. As illustrated in FIG. 1, each model 20 in each graphic-file ((e.g. an animation or SOLIDWORKS™ (3D CAD Software)file)) may be constructed of one or more basic 3D and/or 2D objects or shapes referred to hereinafter as "primitive objects" 10. One or more instructions 30 representing geometrical mathematical operations or functions may define the way in which the primitive objects 10 of a model 20 are combined in a 3D space to construct the model 20.

The instructions 30 may be any mathematical function(s) known in the art of solid modeling, for example, enabling to mathematically express the mathematical combination of at least two of the primitive objects 10. Functions such as Boolean operations, for instance, such as 3D for example, including at least one of: unifying, subtracting and intersecting of the primitive objects 10 of the model 20 such as subtraction of a primitive object 10 from another primitive objects 10, as illustrated in FIG. 1, where at least some of the instructions 30 enabling to combine the primitive objects 10 to construct the model 20. The instruction may include objects' properties enabling to represent the properties of each primitive object 10 required for the combining in relation to the other objects 10 constructing the model 20 and other graphical features. For example, the positioning (coordinates) and the size of each object 10 in relation to the other objects 10 and the like. Each primitive object 10 comprises a set of predefined properties defining its properties such as 1. typical geometrical properties according to primitive types, such as radius, height. 2. common geometrical properties, which refer, for instance, to model positioning in space, such as location, orientation, scale and shared by all typed of objects, both primitive and non-primitive; and 3. common graphical properties such as color, texture, representing model materials, etc. which indicate the graphic appearance of the object 10, which are common all primitive types. All these properties, represented by properties value, may be used when integrated to construct a model 20. All these properties may be subject to changes over time, during animation process.

According to some embodiments of the invention, each model 20 can also be stored as a new primitive object 10 in a recursive manner allowing the computerized system 100 to enlarge its database of primitive objects 10 in time.

The primitive objects 10 may be any predefined 3D and/or 2D objects such as geometrical 3D objects (e.g. cylinder, box, tetrahedron, sphere, half a sphere, elliptic spheres, cone and the like) and other 3D objects that are predefined in the system such as NURBS (non-uniform rational B-splines) surfaces identified by computer graphic tools such as CAD (Computer-Aided Design) tools through control points that indicate the coordinates of points along the surface of the object as well as functions that may indicate the NURBS' curving measures and or the cross-sectional area and 2D object and the like, as known in the art.

For example, as illustrated in FIG. 1 a 3D model 20 may be constructed of a box 10 and a cylinder 10 where the instructions 30 required to achieve the model 20 may be Boolean operation such as subtraction of the cylinder 10 from box's 10.

To construct the final model 20 additional properties of each of the model's objects 10 may be required such as, for example, the location in the modeling space of each object 10 constructing the model 20, the material properties of each object 10 or its parts, shading and contrast and other graphical and geometrical properties required as known in the art.

Additionally, to carry out the construction of the model 20, the instructions 30 may further include the linear transformation, for each primitive object 10, determining of its location coordinates, orientation angle and scaling factor, in modeling space, while actual subtraction occurs. According to some embodiments, the linear transformation may be represented by 4×4 matrixes. Since at list some of the primitive objects 10 have symmetries, it may require much less computation to describe the features of each object and execute the instructions 30.

Figure 2:
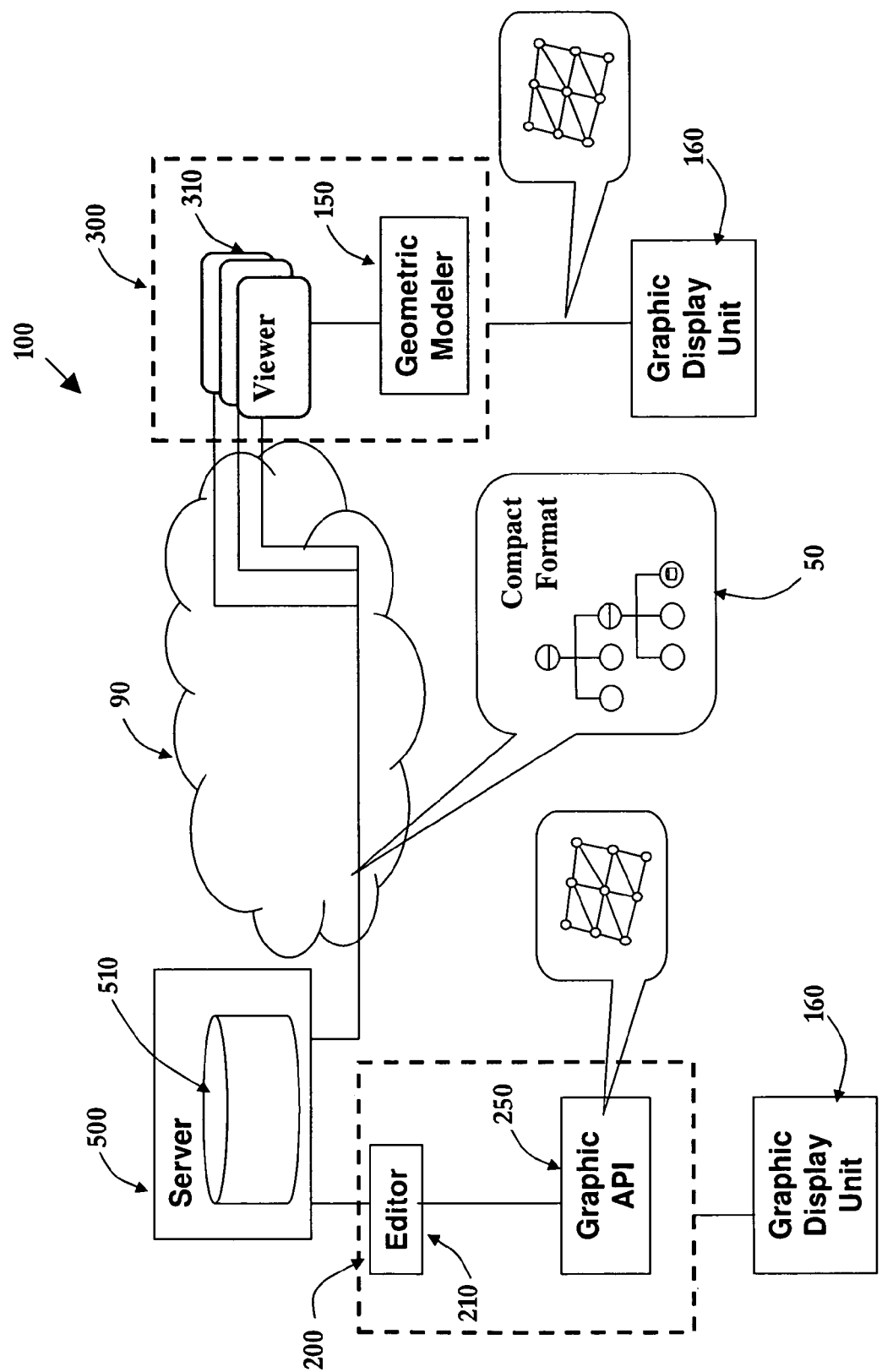
FIG. 2 is a block diagram schematically illustrating of a system for creating and distributing of compacted graphic data files via a communication network, according to some embodiments of the invention.
Figure 3:
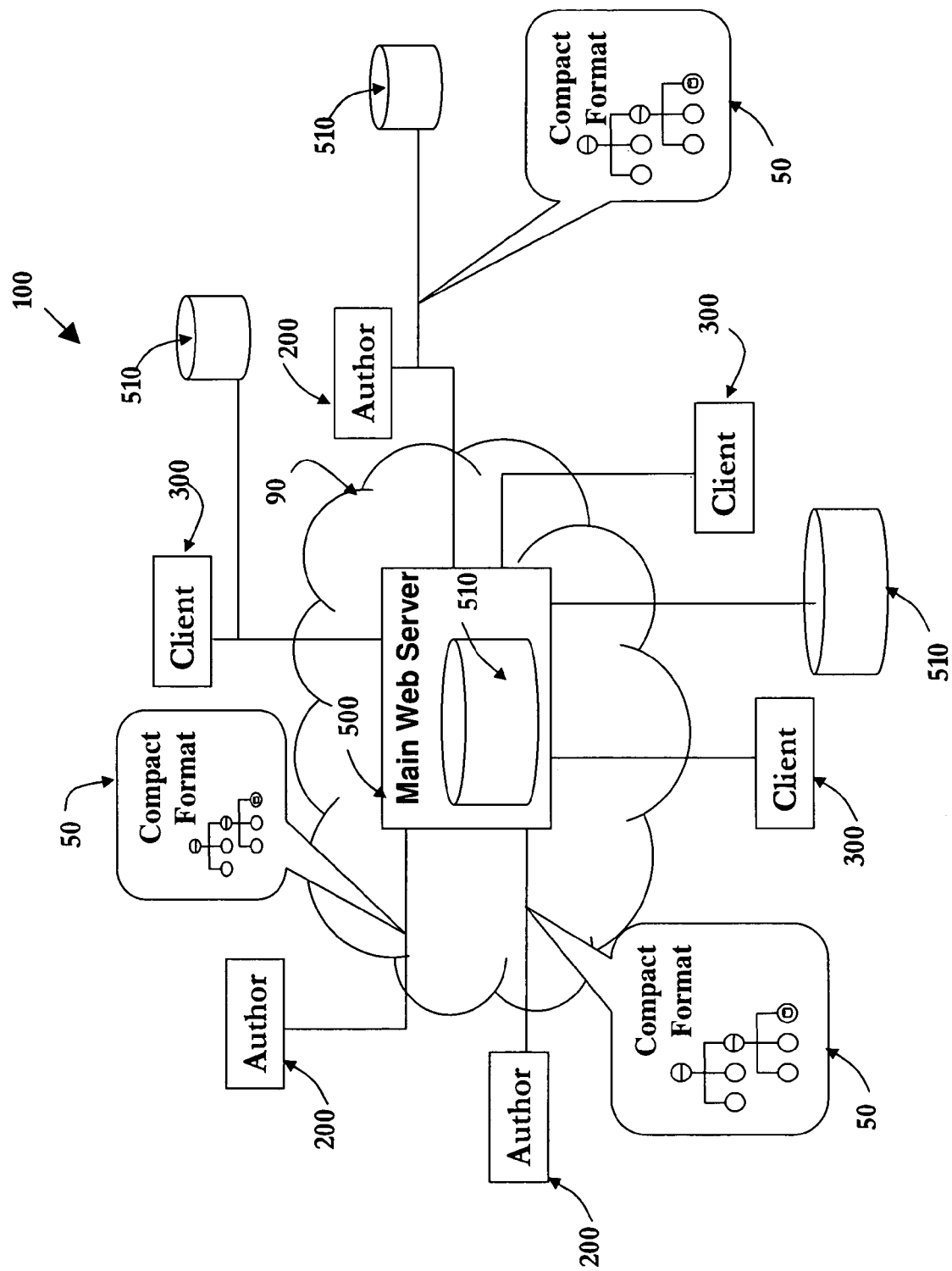
FIG. 3 is a block diagram schematically illustrating of a system for creating and distributing of compacted graphic data files via a communication network, according to some embodiments of the invention.

FIG. 2 and FIG. 3 are block diagrams schematically illustrating a computerized system 100 for creating and distributing of compacted representation files 50 via at least one data communication network 90, according to some embodiments of the invention.

According to these embodiments, the computerized system 100 may comprise: at least one author application 200 enabling a user to compact 3D graphic-files 20 into compacted representation files 50; at least one client application 300 enabling receiving, processing (un-compacting) and displaying compacted representation files 50; and at least one server 500 operatively associated with the author and client applications 200 and 300.

The Author application 200 may be an off-line desk application or a client application enabling online processing of data for compacting models 20 and creating representation files 50.

According to some embodiments of the invention, the server 500 may also be operatively associated with at least one primitives' database 510, which may comprise predefined primitive objects 10.

According to some embodiments of the invention, the author application 200 may enable compacting of 3D graphic-files and creating compacted representation files 50 by identifying the primitive objects 10 constructing each of the models 20 in the graphic-file and assigning indicators to each identified object 10, identifying the instructions 30 for combining at least two of the identified primitive objects 10 and other additional objects' properties required to construct the models 20 of the graphic-file. The Instructions 30 may define the mathematical functions according to which the model's 20 primitive objects 10 are combined and constructed to form each model 20 of the graphic-file. The compacted representation file 50 may be of substantially smaller in data size than its original graphic-file, with negligible or no data losses. Therefore, the system 100 may be extremely efficient for distributing data through data communication networks 90 of narrow bandwidth spans, or in cases where the original graphic data of the graphic-file is extremely heavy and large.

According to some embodiments of the invention, as illustrated in FIG. 3, the system 100, the server 500 may enable storing and retrieving primitive objects 10 from at least one of: remote primitives' database 510 or local primitives' database 510.

According to some embodiments of the invention, as illustrated in FIG. 2, the client application 300 may comprise:

A viewer application 310, which may be a web application, enabling identifying models 20, primitive objects 10, Instructions 30 for combining primitive objects 10 and other objects' properties; and A geometric modeler 150 enabling to operate the instruction of the representation file upon the objects indicated in the representation file to construct the model compacted thereby, which may enable converting the resulting model 20, from its internal representation, to a polygonal form, ready for display by graphic application 250 such as the standard OpenGL and Direct3D; and at least one display unit 160 enabling to display 3D graphic-files 20.

The viewer application 310, geometric modeler 150 and display unit 160 may be operatively associated with one another enabling receiving of compacted representation files 50, identifying the model(s) 20 in each compacted representation file 50 and displaying the identified models 20. The identification of each model 20 may be carried out by identifying the instructions 30 and the primitive objects 10 of each model 20 and combining the identified primitive objects 10 according to the identified instructions 30 for combining the identified primitive objects 10 and according to the objects' properties.

According to some embodiments of the invention, the instructions 30 may be translated by the viewer application 310 into a set of computer readable commands according to which the models 20 can be identified and displayed.

According to some embodiments of the invention, as illustrated in FIG. 2, the geometric modeler 150 may enable operating animation scenes of an animation movie comprising 3D graphic-files, where each file may comprise either moving models 20) models 20 that can change over time) or where the displaying of each graphic-file represents one frame of one scene of the animation.

According to some embodiments of the invention, as illustrated in FIG. 2, the client application 300 may comprise:

an editor application 210, which may be a web application, enabling identifying models 20, primitive objects 10, instructions 30 for combining primitive objects 10 and other objects' properties of a graphic-file and compacting the graphic file creating a compacted representation file 50 of a substantially smaller data size that its origin graphic-file, with substantially negligible or no data losses;

a graphic application 250 enabling the user to view and create 3D models 20 of graphic-files (e.g. CAD/animation tools); and at least one display unit 160 enabling to display 3D graphic-files 20.

According to some embodiments of the invention, the editor application 210 may enable compacting the graphic-files of each scene/frame of the movie/scene into compacted representation files 50 as well as online continuous transmission (distribution) of the compacted representation files 50 of the scenes/frames, to optimize the time in streaming of the animated movie scenes/frames through the at least one data communication network 90.

Accordingly, the viewer application 310 may enable real time and online receiving of the compacted representation files 50, identifying the primitive objects 10 and instructions 30 for combining the objects 10 and displaying the scenes/frames according to the operations 30 and objects 10.

Figure 4:
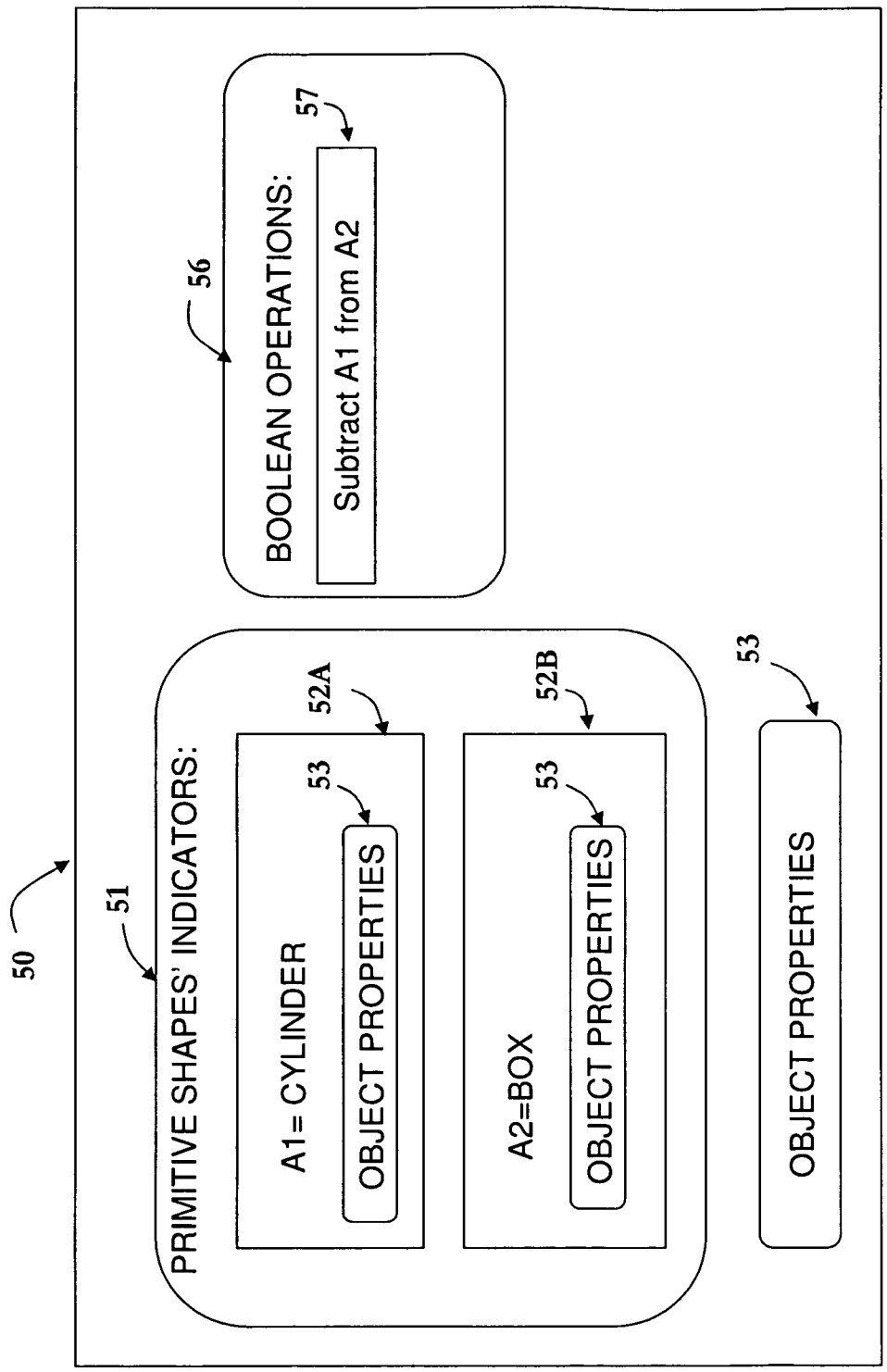
FIG. 4 is a block diagram schematically illustrating a compacted representation file, according to some embodiments of the invention.

FIG. 4 is a block diagram schematically illustrating a compacted representation file's 50 data structure, according to some embodiments of the invention. The compacted representation file 50 may comprise:

Primitive objects' indicators 51;
Instruction instructions 56; and
Objects' properties 53.

The primitive objects' indicators 51 may indicate predefined sign (indicator) of the primitive objects 10 of each model 20 in the file 50 (according to a predefined indicators' 51 list enabling to identify the type of primitive object 10). For example, as illustrated in FIG. 4, referring to the objects 10 and model 20 illustrated in FIG. 1, a cylinder indicator 52A and a box indicator 52B. This means that only an indication of the actual primitive object 10 is saved and not the entire object graphics (E.g. polygonal surface of the object), which may save a substantial data storage room of the compacted representation file 50.

According to some embodiments of the invention, the identification of primitive objects 10 of an model 20 may be carried out by identifying the indicators 51 listed in the compacted representation file 50 and using the indicators 51 in order to search through primitives database(s) 510 to find the primitive objects 10 indicated by these indicators 51.

The instructions list 56 of each two or more primitive objects 10 constructing each model 20 may include the specific superposition or mathematical function required 57 (e.g. subtracting 52A from 52B) as well as other functions and definitions such as the scaling of the sizes and proportions of each primitive object 10 and the exact location (coordinates) of each primitive object 10 in correspondence to the other and the like.

The objects' properties 53 may be any graphic/animation properties of each model 20 of the compacted representation file 50 and/or the model's 20 primitive objects 10 such as, for example, texture of the model/objects, coordinates of each object 10 in relation to the proportions of the screen and in relation to one another, colors, contrasts and the like.

According to some embodiments of the invention, the objects' properties 53 may comprise values of properties and the way they may change in time (e.g. of a table of values per time interval or interpolation/extrapolation calculation algorithm or formula) where each file 50 can be rendered to display the file as a scene of an animated movie.

According to some embodiments of the invention, the server 500 may be a web server 500 enabling storing, receiving and transmitting of primitive objects' 10 indicators 51 and/or compacted representation files 50 via at least one data communication network 90 such as the internet, the WAP, wireless communication network and the like.

In cases where each distributed compacted representation file 50 represents a frame of an animated movie the transmission of compacted files may enable efficient, loss free and time saving online streaming of movies' data (e.g. frames) in real time.

Figure 5:
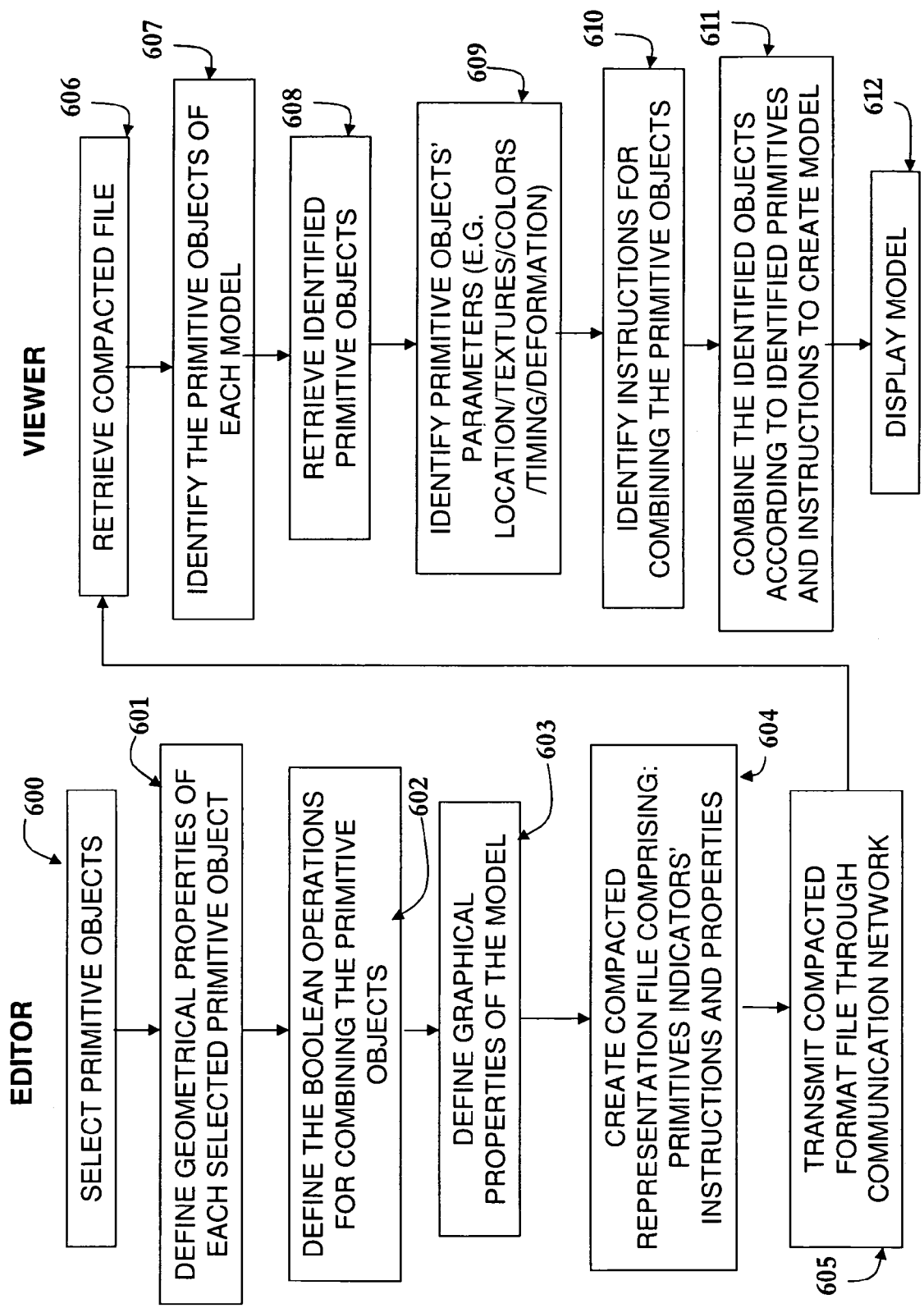
FIG. 5 is a flowchart schematically illustrating of a method for creating and distributing of compacted graphic data files via a communication network, according to some embodiments of the invention.

FIG. 5 is a flowchart schematically illustrating of a method for creating and distributing of compacted representation files 50 via at least one data communication network 90, according to some embodiments of the invention, the method may include at least some of the following steps:

Selecting primitive objects 600, where the author application 200 may enable the user the selecting using graphic tools;

Defining the geometrical properties of each selected primitive object 601, where the author application 200 may enable the user the defining, using graphic tools;

Defining the operations (e.g. the Boolean operations) 30 for combining the selected primitive objects 10 to create the model 602

Defining graphical properties of the model 603 (e.g. colors, texture, decoration, background etc.);

Creating a compacted representation file 50 comprising: indicators indicating the selected primitive objects 10 instructions and properties 604;

Transmitting the created representation file 50 through the at least one communication network 605;

Receiving the transmitted compacted file 606, where the client application 300 may receive the transmitted file;

Identifying the primitive objects 10 of each model 20 of the received compacted representation file 607;

Retrieving the identified primitive objects 10 of each of the models 608 (e.g. from at least one remote or local database 510 comprising all the predefined primitive objects 10 available by the system 100);

Identifying properties 609 of the identified objects 10;
identifying the instructions 30 for combining identified primitive objects 610;

Combine the identified primitive objects 10, according to identified instructions and properties 611 to create the model 20; and Displaying the model 20 612.

According to some embodiments of the invention, a multiplicity of users using a multiplicity of author and client applications 200 and 300 respectively, may be able to efficiently share graphic-files by sending one another compacted representation files 50 to view and edit graphics such as animation, SOLIDWORKS™ (3D CAD Software) files and the like in an efficient and time saving manner.

FIG. 6 schematically illustrates Extruded surfaces resulting from sweeping a profiles along curved lines to produce surfaces models 20, according to some embodiments of the invention.

As illustrated in FIG. 6, the extruded 3D surfaces 20 may be defined by one of the 2D cross section profiles 13, 14 and 15 swept along at least one curved path 11 possibly with a scaling variation path 12.

According to some embodiments, curved line primitives such 11 and 12 may be non-uniform rational B-splines (NURBS) compactly represented and by a set of control points.

According to some embodiments, the close profiles 13, 14 and 15, may be compactly represented as 2D primitive shapes 10. Shapes may be represented (i) as regular polygons (e.g. shape 1) for example, by 1. Number of edges 2. Radius; (ii) as filleted regular polygon with additional properties representing filet radius (e.g. shape 14).

According to some embodiments of the invention, the system 100 may enable users to add objects to at least one of the databases, where the objects may be new models 20 constructed by the user and defined as new primitive objects 20. For example, the object of model 20 illustrated in FIG. 1 may be saved and defined by the user (e.g. by using the author application 210 tools) as a new "primitive object" 10 in the primitives database 510 for other users to use when editing/creating a new graphic-file and when identifying the primitive objects 20.

FIG. 7 is a schematic illustration of web application 700 for compacting and rendering of 3D animation files, according to some embodiments of the invention. In these embodiments, the editor application 210 and viewer application 310 are embedded in a web application 700 maintained and operated by the web server 500, where the users (either viewers and/or authors) with graphic applications 150 installed in their terminals, may use the web application 700 (which may maintain a website for instance) to carry out the compacting of animation graphic-files and/or for rendering and viewing transmitted compacted representation files 50. The editor and viewer applications 210 and 310 may run through the users' terminals (e.g. PCs) or downloaded.

According to some embodiments of the invention, the system 100 may allow users to defined and stores models 20 as primitive objects 10, enabling to recursively create more complex shapes and models 20 out of already combined shapes.

According to some embodiments, one of the operations 30 may be geometric space deformation, where a first operand may be any object 20 and second operand may be at least one primitive object 10, associated with at least one deformation rule—resulting in a deformed model 20 and/or object 10. According to embodiments, compaction of deformed model 20 may be achieved by storing a deformation type indicator and compacted operands.

As illustrated in FIG. 8, the 3D text 10 may be subject to deformation along curved path 10, resulting in the deformed 3D test 30. According to some embodiments, the compacting may be based on path control points representation, which is regarded as the primitive object(s) 10, and 3D text representation by: 1. text 2. font type 3. beveled profile as a 2D curve, which may be regarded as a different primitive object 10.

According to some embodiments, known types of deformations may include: Free Form Deformation—, which relates to changes in lattice(s) of points; Function deformation, which relates to any predefined or user defined functions that enable mapping 3D space to 3D space; and Animated Characters deformation—where the object 10 is based on skeleton (set of line segments connected by joints) and geometric object with limbs, (typically a model 10 of a human or an animal subject) each limb matches a line in the skeleton. Deformation of the initial model may be achieved by reposition of the line segments (keeping the segments connected), where the repositioning causes smooth deformation of the matching limbs. Compaction of animated character may be achieved by storing one compacted representation of the initial character model and initial matching skeleton. Any new character configuration representation may require storing only new locations of skeleton joints.

Subdivision Surface is another powerful modeling tool based on recursive subdivision of polygonal surface until desired smoothing level is achieved. According to some embodiments, a subdivided polygonal model may be compacted by storing the initial polygonal object and by storing the number of the recursion steps applied.

While the invention has been described with respect to a limited number of embodiments, these should not be construed as limitations on the scope of the invention, but rather as exemplifications of some of the preferred embodiments. Those skilled in the art will envision other possible variations, modifications, and applications that are also within the scope of the invention. Accordingly, the scope of the invention should not be limited by what has thus far been described, but by the appended claims and their legal equivalents.

What is claimed is:

1. A computerized system of compacting at least one three-dimensional (3D) geometric file comprising at least one 3D geometric model, for facilitating efficient distribution of compacted representation files via at least one data communication network, the system comprising:
   at least one author client application enabling compacting of each 3D geometric model in the 3D geometric file into at least one compacted representation file;
   at least one client application enabling display and modification of compacted representation files;
   at least one database of primitive and non-primitives objects, said at least one database is operatively associated with the at least one client application and the at least one author client application,
   wherein the at least one author client application enables compacting each 3D geometric model by representing it through at least two of the primitive objects, represented by indicators wherein each indicator represents a different primitive object of the respective 3D model, and other additional properties,
   the compacted representation file further includes a set of instructions that enables combining at least two primitive objects to construct the 3D geometric model,
   wherein the at least one client application enables retrieving the indicators enabling identification of the at least two primitive objects, the instructions and the properties of each 3D geometric model, and constructing each 3D geometric model represented by the compacted representation file by combining the identified at least two primitive objects according to the set of instructions and the properties in the compacted representation file,
   wherein the set of instructions includes at least one operation enabling combination of the at least two primitive objects of the 3D geometric model, wherein said operation is a geometric operation including at least one of: extruding, smoothing by recursive subdivision deforming along a curved line, Free Form Deformation (FFD), or Boolean operations including at least one of unifying, subtracting and intersecting of the primitive objects of the 3D geometric model,
   wherein said client application utilizes a geometric modeler unit to carry out instructions for construction of geometrical objects resulting in a 3D polygonal mesh;
   at least one display unit enabling a use to view the 3D polygonal mesh created by the geometric modeler,
   wherein the set of instructions further includes a linear transformation, for each at least two primitive objects, linear operations which affect their location coordinates, orientation angle and scaling factor in modeling space, and
   wherein the set of instructions operates on both primitive and non-primitive geometric objects.

2. The computerized system of claim 1, wherein the computerized system further comprises at least one server operatively associated with the at least one author client application, enabling communication with the at least one client application to allow distributing of compacted representation files to a multiplicity of users.

3. The computerized system of claim 1, wherein the computerized system further enables compacting animated models by transmitting changes in properties of the primitive objects of the 3D geometric odd, wherein the properties of each 3D geometric model represent geometrical and graphical properties of each identified primitive object, wherein changes in time of the physical properties of each object of the 3D geometric model enables animating the 3D geometric model.

4. The computerized system of claim 1, wherein the system further comprises an editor application enabling carrying out the compacting of 3D geometric models into compacted representation files and transmission of the compacted representation files through at least one communication network; and
   a multiplicity of author client applications enabling creation, reconstruction or modification of at least one 3D geometric file that was received from the at least one communication network.

5. The computerized system of claim 4, wherein the multiplicity of author client applications enables creating a 3D geometric file for an efficient streaming of animated models via the at least one communication network, wherein said enabling of efficient streaming is carried out by the editor application enabled by transmitting changes in properties of the primitive objects of each 3D geometric model, which are subject to change,
   wherein the properties of each 3D geometric model represent geometrical and graphical properties of each primitive object, wherein changes in time of the physical properties of each object of the 3D geometric model enable animating the 3D geometric model.

6. The computerized system of claim 1, wherein the client application comprises:
   a viewer application, enabling identification of 3D geometric models, identifying primitive objects thereof, instructions for combining the identified primitive objects of the identified 3D geometric model and other properties of the identified 3D geometric model;

a geometric modeler enabling operation of the instruction of received representation files and combination of the identified primitive objects to construct the 3D geometric models of representation files; and at least one display unit enable the user to view 3D geometric models, wherein the viewer, geometric modeler and display unit are operatively associated to enable receiving of compacted representation files and displaying models by displaying identified primitive objects of each 3D geometric model of each compacted representation file according to the instructions for combining the primitive objects and other 3D geometric model properties, and wherein the instructions are translated by the viewer application into a set of computer readable instructions according to which the 3D geometric models are combined and displayed.

7. The computerized system of claim 2, wherein the server is a web server enabling online storing and transmitting of compacted representation files.

8. The computerized system of claim 1 wherein each primitive object is one of: a three-dimensional or a two-dimensional shape.

9. The computerized system of claim 8, wherein at least some of the predefined primitive objects that are identified by the system are one of: non-uniform rational B-splines (NURBS) surfaces or trimmed NURBS, where each NURBS surfaced object is defined by control points and by at least one cross section object.

10. The computerized system of claim 1, wherein the system further enables storing 3D geometric models as primitive objects in the at least one database of primitive objects and non-primitive objects.

11. The computerized system of claim 1, wherein the client application identifies the primitive objects of each 3D geometric model by identifying the indicators of each 3D geometric model and retrieving the identified primitive objects from the at least one of primitive objects and non-primitive objects database.

12. The computerized system of claim 1, wherein the author application is a client application enabling online processing of data for compacting 3D geometric models and creating representation files.

* * * * *